United States Patent
Nosu et al.

(10) Patent No.: US 6,372,835 B1
(45) Date of Patent: Apr. 16, 2002

(54) FLAME-RETARDANT POLYKETONE RESIN COMPOSITION AND MOLDED ARTICLE

(75) Inventors: Tsutomu Nosu; Yoshiharu Sawa, both of Sakaide (JP)

(73) Assignee: Kyowa Chemical Industry Co., Ltd., Kagawa (JP)

( * ) Notice: Subject to any disclaimer, the term of this patent is extended or adjusted under 35 U.S.C. 154(b) by 0 days.

(21) Appl. No.: 09/786,429

(22) PCT Filed: Jul. 3, 2000

(86) PCT No.: PCT/JP00/04402

§ 371 Date: Mar. 6, 2001

§ 102(e) Date: Mar. 6, 2001

(87) PCT Pub. No.: WO01/04214

PCT Pub. Date: Jan. 18, 2001

(30) Foreign Application Priority Data

Jul. 9, 1999 (JP) ............................. 11-196253

(51) Int. Cl.⁷ ......................... C08K 3/22; C08K 5/524; C08K 9/04
(52) U.S. Cl. .................. 524/436; 524/127; 524/147; 523/200
(58) Field of Search ................. 524/436, 127, 524/147; 523/200

(56) References Cited

U.S. PATENT DOCUMENTS

| 4,843,144 A | | 6/1989 | Van Broekhoven |
| 4,880,903 A | | 11/1989 | Van Broekhoven |
| 4,885,328 A | * | 12/1989 | Danforth et al. |
| 5,286,785 A | | 2/1994 | Gijsman |
| 5,684,117 A | | 11/1997 | Londa |
| 6,218,454 B1 | * | 4/2001 | Nosu et al. |

FOREIGN PATENT DOCUMENTS

| EP | 0 390 294 | 10/1990 |
| EP | 0 391 605 | 10/1990 |
| JP | 02274767 | 11/1990 |
| JP | 11071513 | 3/1999 |
| JP | 11116795 | 4/1999 |
| JP | 20007883 | 1/2000 |

* cited by examiner

*Primary Examiner*—Tae H. Yoon

(57) ABSTRACT

A polyketone resin composition, which has flame retardancy and is suitable for a variety of molded articles is provided. A flame-retardant resin composition obtained by incorporating 15 to 60% by weight of surface-coated magnesium hydroxide having a specific surface area measured by a BET method of 1 to 15 $m^2/g$ and an average secondary particle diameter of 0.2 to 5 $\mu m$ into a polyketone resin; and molded article thereof.

14 Claims, No Drawings

FLAME-RETARDANT POLYKETONE RESIN COMPOSITION AND MOLDED ARTICLE

TECHNICAL FIELD

The present invention relates to flame-retarding of a polyketone resin useful as electrical and electronic components of office automation equipment and household appliances and housing components thereof, automobile parts and machine parts. More specifically, it relates to a flame-retarded polyketone resin composition obtained by mixing specific magnesium hydroxide particles into a polyketone resin and to molded articles thereof.

BACKGROUND ART

A polyketone resin is a novel resin which has been successfully synthesized from carbon monoxide and an olefin to be developed in recent years, and mechanical properties thereof fall into the category of engineering plastics. U.S. Pat. Nos. 4,843,144 and 4,880,903 disclose the production method of a linear alternating ketone terpolymer which is synthesized from an olefin such as ethylene and propylene and carbon monoxide. The thus-obtained polyketone resin is excellent in impact resistance, exhibits high impact resilience both at room temperature and at low temperatures and has excellent creep properties. However, it also has such problems that it is susceptible to a crosslinking reaction during such processes as extrusion and injection, that it has poor melt-stability and that it discolors during processing. To solve these problems, it is disclosed in Japanese Patent Laid-Open Publication No. 11-116795 that an increase in stability at the time of melt-processing and a reduction in discoloration can be accomplished by adding a stabilizer comprising a polyol and an aluminum hydroxide compound to an aliphatic ketone polymer synthesized from carbon monoxide and at least one ethylenic unsaturated hydrocarbon. In addition, the addition of an impact resistance improving agent, a flame retardant, a reinforcing filler, an antioxidant and other polymer is also disclosed therein. However, there is no detailed description of flame-retarding of this polymer in the publications.

Further, Japanese Patent Laid-Open Publication No. 11-71513 discloses a polyketone resin composition obtained by mixing 0.01 to 50 parts by weight of a liquid crystal resin, for the purpose of improving the thin-wall flowability, heat resistance, resistance to organic solvents and moldability which are useful as housing components, and 0.01 to 60 parts by weight of a flame retardant into 100 parts by weight of a polyketone resin. This publication discloses that an organic bromide, an organic phosphide, a red phosphor and the like can be used as the flame retardant and that the red phosphor may be coated with a metal hydroxide such as magnesium hydroxide. However, from the point of safety orientation at the present time, the use of the organic halogen-containing flame retardant is on its way to diminish, and the flame retardant containing phosphorus such as red phosphor is not considered satisfactory because of such problems as the generation of phosphine gas, odor and discoloration at the time of processing.

Problems to be Solved by the Invention

The object of the present invention is to provide a flame-retardant polyketone resin composition which does not cause damage to the working environment during the flame retarding process of a polyketone resin composition, has good moldability, retains the physical properties of the resin, and is useful as electrical and electronic components of office automation equipment and household appliances and housing components thereof, automobile parts and machine parts, all of which have an excellent appearance.

Means for Solving the Problems

The present inventors have made various studies to solve the above problems and completed the present invention by mixing a predetermined amount of specific magnesium hydroxide particles into a polyketone resin.

The magnesium hydroxide particles used in the present invention are coated surface of magnesium hydroxide particles whose crystals grow well and which hardly agglomerate. The production method of the magnesium hydroxide particles as an additive or a flame retardant for a resin has already been known, and the magnesium hydroxide particles whose crystals grow well and which hardly agglomerate can exhibit good moldability, mechanical strength and flame retardancy. They are synthesized by the reaction between an aqueous magnesium salt such as magnesium chloride and an alkali such as caustic soda. Further, magnesium hydroxide particles obtained by the re-hydration of magnesium oxide or natural magnesium hydroxide can also be used as the flame retardant.

However, when the conventional magnesium hydroxide particles or magnesium hydroxide particles whose crystals have been fully grown for the purpose of improving the dispersibility in a resin are mixed into a polyketone, the polyketone is degraded by the heat generated at the time of molding. Since this degradation affects the mechanical properties and coloration, surface-treated magnesium hydroxide particles are used in the present invention.

According to the studies made by the present inventors, the above object of the present invention is achieved by a flame-retardant polyketone resin composition which substantially comprises (1) 40 to 85% by weight of a polyketone resin based on the total weight of the composition and (2) 15 to 60% by weight of magnesium hydroxide particles, based on the total weight of the composition, which have (a) a specific surface area measured by a BET method of 1 to 15 m²/g, (b) an average secondary particle diameter of 0.2 to 5 μm, and (c) a surface coated with a surface-treating agent.

The resin composition of the present invention will be described in more detail hereinafter.

The polyketone resin used in the present invention is generally referred to as an aliphatic polyketone resin. The polyketone resin is obtained by reacting an olefin which mainly contains ethylene with carbon monoxide as described above. The polyketone resin may be one that can be used for molding and can be produced by any methods.

The polyketone resin is preferably a resin obtained by reacting an olefin mixture containing ethylene and a small portion of other olefin with carbon monoxide. The particularly preferable polyketone resin is a linear alternating ketone terpolymer in which the molar ratio (Y/X) of the following recurring units (X) and (Y) in the main chain:

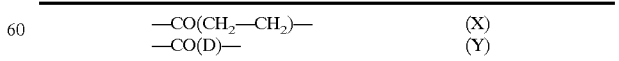

| —CO(CH₂—CH₂)— | (X) |
| —CO(D)— | (Y) |

(wherein D is an alkylene chain other than the ethylene chain (—CH₂—CH₂—)) is 0.01 to 0.2, preferably 0.02 to 0.1. The above recurring unit (X) is a unit based on ethylene, and the above recurring unit (Y) is a unit based on an olefin other than ethylene. The D in this Y is specifically an alkylene chain based on propylene, butylene, pentene or styrene, and the alkylene chain based on propylene is particularly preferable.

In the present invention, the magnesium hydroxide particles mixed into the above polyketone resin has a specific surface area measured by a BET method of 1 to 15 m²/g, preferably 2 to 10 m²/g. Further, the magnesium hydroxide particles have an average secondary particle diameter measured by a laser beam diffraction-scattering method of 0.2 to 5 μm, preferably 0.5 to 3 μm.

When the magnesium hydroxide particles having the above form are mixed into the polyketone resin in such an amount that is sufficient to impart flame retardancy to the polyketone resin, the flowability substantially lowers, the moldability deteriorates and the physical properties lower.

In the present invention, the magnesium hydroxide particles having the above form are coated with a surface-treating agent before use. When the surface-coated magnesium hydroxide particles are used, the resin composition exhibits improved flowability and excellent moldability, and the obtained molded article exhibit improved physical strength and coloring properties. As a matter of course, flame retardancy of at least V-1 is achieved on the basis of the UL94 standard, and flame retardancy of V-0 is achieved in most cases.

Illustrative examples of the surface-treating agent used for coating the surfaces of the magnesium hydroxide particles include (a) $C_{14}$ to $C_{24}$ higher fatty acids and alkali metal salts thereof, (b) phosphoric esters, (c) sulfuric ester salts of higher alcohols such as stearyl alcohol and oleyl alcohol, (d) silane coupling agents such as vinyl ethoxy silane, γ-methacryloxypropyl trimethoxysilane and γ-aminopropyl methoxysilane and (e) polymers such as styrene-acryl-based low-molecular-weight polymers.

As the surface-treating agent, the phosphoric esters in the above (b) has a better effect. According to the studies of the present inventors, it has been found that the phosphoric esters represented by the following formula (1) are particularly preferable.

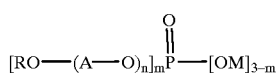
(1)

(wherein R is an alkyl group having 1 to 24 carbon atoms or an alkenyl group having 2 to 24 carbon atoms, A is an alkylene group having 2 to 4 carbon atoms, n is an integer of 0 to 6, m is 1 or 2, and M is a cation which represents an alkali metal, an alkyl amine having 1 to 4 carbon atoms or an alkanol amine represented by the following formula:

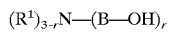

wherein $R^1$ is a hydrogen atom or an alkyl group having 1 to 3 carbon atoms, B is an alkylene group having 2 to 4 carbon atoms, and r is an integer of 1 to 3)

Of the phosphoric esters represented by the above formula, the sodium salt of stearyl alcohol phosphoric ester is suitable.

The surface treatment is conducted as follows. The magnesium hydroxide particles dispersed in water are maintained at least at the temperature where the surface-treating agent is dissolved or emulsified, the aqueous solution of the surface-treating agent is gradually injected into the dispersion under agitation, and the resulting mixture continues to be agitated 15 to 30 minutes after the completion of the injection. The obtained slurry of the surface-treated magnesium hydroxide particles is dehydrated, washed with water and dried in accordance with the commonly used method. Further, when a compound insoluble in an aqueous solvent such as higher fatty acids is used, it is molten by heat or an organic solvent and mixed into the magnesium hydroxide powders to surface-treat the particles by a dry process using a Henschel mixer or the like. The surface-treating agent is used in an amount of 0.5 to 5% by weight, preferably 2 to 4% by weight based on the magnesium hydroxide particles.

By mixing the surface-treated magnesium hydroxide particles into a resin composition in an amount of 15 to 60% by weight, preferably 20 to 50% by weight, a polyketone resin composition which has suitable resin physical properties and undergoes little coloration can be obtained. When the content of the magnesium hydroxide particles is smaller than the above range, the flame retardancy is insufficient, while when it is larger than the above range, the flowability of the resin is poor and the moldability and mechanical strength thereof are insufficient disadvantageously.

Further, the flame-retardant resin composition of the present invention may contain other polymers in such an amount that does not impair the physical properties and appearance. For example, polyester resins, polyamide resins, polyacetals, polyethylenes, polypropylenes, ABS and polystyrenes may be contained. When these are used in combination, it is desirable to use a polyketone in which groups of one type selected from the group consisting of hydroxyl groups, carboxylic acid groups, carboxylate groups and carboxylic anhydride groups are added in the molecule or to some of the terminals. It is desirable that the total amount of these other polymers be not more than 20% by weight, preferably not more than 10% by weight, based on the resin composition of the present invention.

Further, the flame-retardant polyketone resin composition of the present invention may also contain antioxidants, age resistors, heat stabilizers, ultraviolet absorbers, light stabilizers, lubricants, mold releasing agents, colorants, pigments, crystallization nucleating agents, plasticizers and other flame retardants such as organophosphorus compounds and antimony trioxide as required.

The flame-retardant polyketone resin composition of the present invention is produced by a generally known method. For example, it can be obtained by mixing a polyketone resin, surface-treated magnesium hydroxide particles and other necessary additives together or by supplying these to separate extruders or the like and melt-kneading them at temperatures of 150° C. to 350° C. The mixer may be a single-screw or twin-screw extruder having a mixing unit or a kneading machine such as a kneader.

EXAMPLES

The present invention will be described in more detail with reference to the following examples. The methods for measuring the values of various properties are as follows.

(1) Average secondary particle diameter: A sample was prepared by crushing the obtained dry magnesium hydroxide powders by a hammer mill and moistening them with ethanol, and the resulting sample was charged into an aqueous solution of hexametaphosphoric acid to prepare a 1 wt % aqueous slurry. After the slurry was subjected to ultrasound for 3 minutes for promoting dispersion, 1 ml of the resulting slurry was charged into a MICROTRACK (laser beam diffraction-scattering method: a product of NIKKISO) circulating fluid to measure the average secondary particle diameter.

(2) Flowability of resin (MFR): This was measured at 240° C. and under a testing load of 2.16 Kgf in accordance with a manual cutting method of the JIS K 7210 testing method.

(3) Tensile strength: This was determined by measuring the first test piece at a speed of 5 mm/min in accordance with JIS K 7,113.
(4) Elongation: This was measured in accordance with JIS K 7113 under the same condition as the tensile strength was measured.
(5) Izod impact test: This was measured in accordance with JIS K 7110.
(6) DU PONT impact test: This was measured in accordance with JIS K 5400 using an impact deformation tester with an impact point diameter of 3/16 inches.
(7) Coloration (Y.I): This was measured by ZE-2000, a product of NIPPONDENSHOKU CO., LTD.
(8) Flame-retardancy test: This was measured in accordance with the flame retardancy test standard UL94V. The results of testing were classified into 4 levels: V-0, V-1, V-2 and non-standard.

The tensile strength, elongation, DU PONT ball impact test, coloration (Y.I) and flame-retardancy test were measured/conducted using an injection-molded test piece.

Preparation of Sample for Evaluating Magnesium Hydroxide Particles

Sample 1

Ten liters of a 100-g/l aqueous slurry of magnesium hydroxide particles synthesized by the reaction between magnesium chloride and sodium hydroxide was prepared. The slurry was aged by heating at 170° C. for 5 hours under agitation. After the slurry was cooled and taken out, it was heated again to 80° C. Then, 35 g of sodium stearate which had been dissolved in warm water in advance was gradually poured into the slurry of magnesium hydroxide particles under agitation, and the agitation was continued for 30 minutes. After cooled, the resulting mixture was subjected to solids-liquid separation, washed, dried at 120° C. and crushed by a hammer mill for testing. The resulting sample had a specific surface area measured by a BET method of 6 $m^2/g$ and an average secondary particle diameter of 0.9 $\mu$m. The amount of the sodium stearate used for coating the magnesium hydroxide particles was 3.1% by weight based on the magnesium hydroxide particles.

Sample 2

A sample was prepared in the same manner as the sample 1 except that the sodium salt of stearyl alcohol phosphoric ester was used in place of the sodium stearate. The sample had a specific surface area measured by a BET method of 5.8 $m^2/g$ and an average secondary particle diameter of 0.9 $\mu$m. The amount of the phosphoric ester used for coating the magnesium hydroxide particles was 3.0% by weight based on the magnesium hydroxide particles.

Sample 3

The sample 1 before the surface treatment was used. The sample had a specific surface area measured by a BET method of 6.8 $m^2/g$ and an average secondary particle diameter of 0.9 $\mu$m.

Sample 4

The same procedure for the sample 2 was repeated using the magnesium hydroxide which had been synthesized by the reaction between magnesium chloride and calcium hydroxide and which had a specific surface area measured by a BET method of 35 $m^2/g$ and an average secondary particle diameter of 0.5 $\mu$m. The amount of the phosphoric ester used for coating the magnesium hydroxide particles was 3.0% by weight based on the magnesium hydroxide particles.

Examples 1 to 3 and Comparative Examples 1 to 6

The samples of the above magnesium hydroxides were mixed according to the compositions shown in Table 1 and supplied to a twin-screw extruder set at 220° C. to 240° C. to form into pellets. The obtained pellets were dried in vacuum at 60° C. for 16 hours and formed into samples for testings by an injection-molding machine having a cylinder unit temperature of 220° C. to 245° C., a mold temperature of 60° C. and an injection pressure of 60 Kg/$cm^2$. The results are shown in the following table.

As a polyketone, Carilon (D26VM 100), a product of Shell Chemical Co., Ltd., was used.

TABLE 1

|  | Example | | | Comparative Example | | | | | |
|---|---|---|---|---|---|---|---|---|---|
|  | 1 | 2 | 3 | 1 | 2 | 3 | 4 | 5 | 6 |
| polyketone % | 77 | 60 | 60 | 77 | 60 | 60 | 90 | 30 | 100 |
| sample % | 23 | 40 | 40 | 23 | 40 | 40 | 10 | 70 | 0 |
| (No) | (2) | (2) | (1) | (3) | (3) | (4) | (2) | (3) |  |
| resin flowability g/10 min | 35.4 | 19.6 | 20.2 | 24.8 | 3.9 | 1.2 | 41.6 | 0.8 | 56.5 |
| tensile strength Kgf/$mm^2$ | 4.74 | 3.53 | 3.46 | 6.08 | 5.04 | — | 5.72 | — | 6.22 |
| elongation % | 90 | 52 | 53 | 23 | 10 | — | 130 | — | 350 |
| Izod impact value Kgf · cm/cm | 19.3 | 10.2 | 7.4 | 6.5 | 5.2 | — | 11.5 | — | 12.2 |
| DU PONT ball impact test Kgf · cm | 200< | 80 | 75 | 10 | 5> | — | 200< | — | 200< |
| coloration (Y.I) | 34.6 | 39.2 | 55.8 | 78.7 | 93.4 | — | 29.6 | — | 20.6 |
| flame-retardancy test thickness |  |  |  |  |  |  |  |  |  |
| 1/8 inches | V-0 | V-0 | V-0 | V-0 | V-0 | — | nonstandard | — | nonstandard |
| 1/16 inches | V-1 | V-0 | V-0 | V-1 | V-0 | — | nonstandard | — | nonstandard |

Note) Comparative Examples 3 and 5 in Table 1 could not be injection-molded due to poor resin flowability.

As is obvious from the results of the examples, the resin composition of the present invention can produce a molded article having good moldability and high impact resistance because it has high flame retardancy and good flowability. Therefore, a flame-retarded polyketone resin molded article useful as electrical and electronic components of office automation equipment and household appliances and housing components, automobile parts and machine parts can be obtained.

What is claimed is:

1. A flame-retardant polyketone resin composition which substantially comprises (1) 40 to 85% by weight of a polyketone resin based on the total weight of the composition and (2) 15 to 60% by weight of magnesium hydroxide particles, based on the total weight of the composition, which have (a) a specific surface area measured by a BET method of 1 to 15 m²/g, (b) an average secondary particle diameter of 0.2 to 5 μm, and (c) a surface coated with a surface-treating agent, wherein the surface-treating agent is a phosphoric ester represented by the following formula (1)

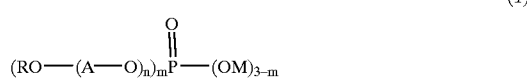
(1)

wherein R is an alkyl group having 1 to 24 carbon atoms or an alkenyl group having 2 to 24 carbon atoms, A is an alkylene group having 2 to 4 carbon atoms, n is an integer of 0 to 6, m is 1 or 2, and M is a cation which represents an alkali metal, an alkyl amine having 1 to 4 carbon atoms or an alkanol amine represented by the following formula:

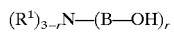

wherein $R^1$ is a hydrogen atom or an alkyl group having 1 to 3 carbon atoms, B is an alkylene group having 2 to 4 carbon atoms, and r is an integer of 1 to 3.

2. The resin composition of claim 1, wherein the polyketone resin has the molar ration (Y/X) of the following recurring units (X) and (Y):

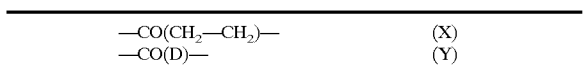

wherein D is an alkylene chain other than the ethylene chain (—CH₂—CH₂) of 0.01 to 0.2.

3. The resin composition of claim 1, wherein the magnesium hydroxide particles have a specific surface area measured by a BET method of 2 to 10 m²/g.

4. The resin composition of claim 1, wherein the magnesium hydroxide particles have an average secondary particle diameter of 0.5 to 3 μm.

5. The resin composition of claim 1, wherein 50 to 80% by weight of the polyketone resin and 20 to 50% by weight of the magnesium hydroxide particles are contained based on the total weight of the resin composition.

6. The resin composition of claim 1, wherein the MFR value is 15 to 60 g/10 min.

7. A molded article molded from the resin composition of claim 1.

8. The molded article of claim 7, which has a value of V-1 or V-0 by the flame retardancy grade based on the UL94 standard.

9. A flame-retardant polyketone resin composition which comprises (1) 50 to 80% by weight of a polyketone resin based on the total weight of the composition and (2) 20 to 50% by weight of magnesium hydroxide particles, based on the total weight of the composition, which have (a) a specific surface area measured by a BET method of 2 to 10 m²/g, (b) an average secondary particle diameter of 0.3 to 3 μm, and (c) more than 2 to 4% by weight based on magnesium hydroxide of a surface coated with a surface-treating agent, wherein the surface-treating agent is an alkali metal salt of stearyl alcohol phosphoric ester.

10. The resin composition of claim 9, wherein the Magnesium hydroxide particles are coated with 3 to 4% by weight based on weight of magnesium hydroxide particles of alkali metal salt of stearyl alcohol phosphoric acid treating agent.

11. The resin composition of claim 9, which comprises (1) 77% by weight of polyketone resin and 23% by weight of magnesium hydroxide particles.

12. The resin composition of claim 9, wherein the MFR value is 15 to 60 g/10 min.

13. A molded article molded from the resin composition of claim 9.

14. The molded article of claim 13, which has a value of V-1 or V-0 by the flame retardancy grade based on the UL94 standard.

* * * * *